(12) United States Patent
Han et al.

(10) Patent No.: US 9,046,921 B2
(45) Date of Patent: Jun. 2, 2015

(54) DISPLAY APPARATUS AND CONTROL METHOD THEREOF

(75) Inventors: Sang-jin Han, Gunpo-si (KR); Yoo-tai Kim, Yongin-si (KR); Jung-geun Kim, Suwon-si (KR); Seung-dong Yu, Hwaseong-si (KR); Jung-Ah Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 13/616,090

(22) Filed: Sep. 14, 2012

(65) Prior Publication Data

US 2013/0076621 A1 Mar. 28, 2013

(30) Foreign Application Priority Data

Sep. 27, 2011 (KR) ........................ 10-2011-0097616

(51) Int. Cl.
| | | |
|---|---|---|
| *G09G 5/00* | (2006.01) | |
| *G06F 3/01* | (2006.01) | |
| *H04N 21/4788* | (2011.01) | |
| *H04N 21/4223* | (2011.01) | |
| *H04N 21/431* | (2011.01) | |
| *H04N 21/472* | (2011.01) | |
| *H04N 21/81* | (2011.01) | |
| *H04N 5/76* | (2006.01) | |

(52) U.S. Cl.
CPC ........ *G06F 3/012* (2013.01); *H04N 5/76* (2013.01); *H04N 21/4788* (2013.01); *H04N 21/4223* (2013.01); *H04N 21/4312* (2013.01); *H04N 21/47205* (2013.01); *H04N 21/8153* (2013.01); *G06F 2203/011* (2013.01)

(58) Field of Classification Search
CPC .......... G06F 3/04815; G06F 2203/011; G06F 3/012; H04N 21/4348; H04N 21/435; H04N 21/44008; H04N 21/4532; H04N 21/482; H04N 21/8549; H04N 5/4401; H04N 21/8153; H04N 5/76
USPC .......... 345/156, 633, 158, 589, 469; 348/468; 725/41; 715/752
See application file for complete search history.

(56) References Cited

U.S. PATENT DOCUMENTS

| | | | |
|---|---|---|---|
| 2006/0025998 A1 | 2/2006 | Sakai et al. | |
| 2006/0026207 A1 | 2/2006 | Sakai et al. | |
| 2009/0073314 A1* | 3/2009 | Uemukai et al. | 348/468 |
| 2011/0134026 A1* | 6/2011 | Kang et al. | 345/156 |
| 2011/0239252 A1* | 9/2011 | Kazama et al. | 725/41 |
| 2011/0246908 A1* | 10/2011 | Akram et al. | 715/752 |

(Continued)

FOREIGN PATENT DOCUMENTS

JP 2010-94493 A 4/2010

OTHER PUBLICATIONS

Communication, dated Feb. 7, 2013, issued by the European Patent Office in counterpart European Patent Application No. 12185653.8.

*Primary Examiner* — Thuy Pardo
(74) *Attorney, Agent, or Firm* — Sughrue Mion, PLLC

(57) ABSTRACT

A display apparatus includes: an image receiving unit which receives a content; a display unit which displays the received content; an image pickup unit which captures images of a user; a storage unit which stores the content and at least one of the captured images of the user; and a control unit which displays a portion of the content with the at least one captured image from among the captured images of the user.

22 Claims, 7 Drawing Sheets

(56) References Cited

U.S. PATENT DOCUMENTS

| | | | |
|---|---|---|---|
| 2012/0081392 A1* | 4/2012 | Arthur | 345/633 |
| 2013/0106682 A1* | 5/2013 | Davis et al. | 345/156 |
| 2013/0106695 A1* | 5/2013 | Davis et al. | 345/158 |
| 2013/0106894 A1* | 5/2013 | Davis et al. | 345/589 |

* cited by examiner

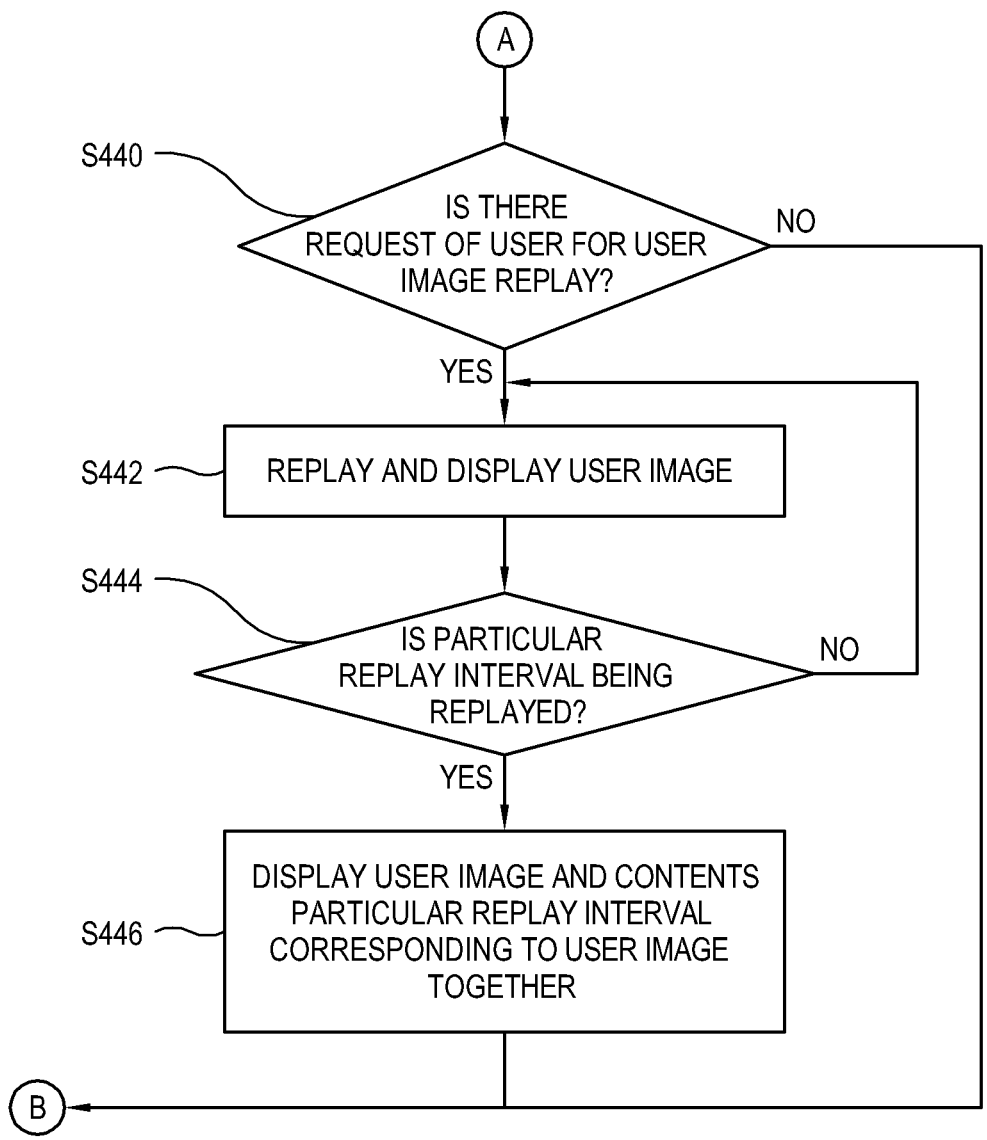

DISPLAY APPARATUS AND CONTROL METHOD THEREOF

CROSS-REFERENCE TO RELATED APPLICATION

This application claims priority from Korean Patent Application No. 10-2011-0097616, filed on Sep. 27, 2011 in the Korean Intellectual Property Office, the disclosure of which is incorporated herein by reference.

BACKGROUND

1. Field

Apparatuses and methods consistent with the exemplary embodiments relate to a display apparatus and a control method thereof, and more particularly, to a display apparatus which is capable of displaying contents and captured images, and a control method thereof.

2. Description of the Related Art

A display apparatus is an apparatus which processes image signals or image data, which are input externally or stored in the apparatus through a variety of processes, and which displays the processed signals or data on a panel or a screen of the apparatus. The display apparatus may be implemented in different forms including, for example, a television (TV), a monitor, a portable media player and so on, depending on processes performed by the apparatus. With recent advance of technologies, types of contents viewable through display apparatuses have been diversified and various functions such as games, image edition and so on have made possible through the display apparatuses.

With diversified contents environments, users watching contents may take their own photographs, share the photographs with others through blogs, Social Network Service (SNS), and other types of forums, and exchange information on contents with other users.

In conventional display apparatuses, although images of users watching contents can be picked up, photographs linked with games and smile shots have been merely provided through a simple photographing method independent of types of contents being watched by users.

SUMMARY

Accordingly, one or more exemplary embodiments provide a display apparatus which is capable of storing contents and captured images of users in synchronization therebetween, and a control method thereof.

The foregoing and/or other aspects may be achieved by providing a display apparatus including: an image receiving unit which receives a content; a display unit which displays the content; an image pickup unit which captures at least one image of a user; a storage unit which stores the content and at least one of the captured at least one image of the user; and a control unit which controls the display unit to display a portion of the content with the stored at least one captured image, captured while displaying the portion of the content, from among the captured at least one image of the user.

The control unit may use the stored at least one captured user image to generate emotional state information relating to the user, and determine the portion of the content.

The control unit may extract a face area from the stored at least one captured image and generate the emotional state information by analyzing a facial expression of the user based on the extracted face area.

The control unit may extract a body area from the stored at least one captured image and generate the emotional state information by analyzing a motion of the user based on the extracted body area.

The display apparatus may further include a voice input unit which receives voice data relating to the user, and the control unit may generate the emotional state information by analyzing the received voice data, and determine the portion of the content.

The control unit may determine whether the emotional state information corresponds to one of a plurality of set states.

The control unit may determine a highlighting interval relating to the content based on highlighting interval information received with the content, and display the highlighting interval relating to the content with the stored at least one captured image, captured while displaying the highlighting interval of the content.

The control unit may determine a highlighting interval relating to the content by analyzing the content, and display the highlighting interval of the content with the stored at least one captured image, captured while displaying the highlighting interval of the content.

The control unit may control the image pickup unit to capture an image of the user when the determined highlighting interval is displayed.

When a replay of the content ends, the control unit may control the display unit to display the portion of the content with the stored at least one captured image.

When the content is displayed in response to a request received from the user, and when the portion of the content is displayed, the control unit may control the display unit to display the portion of the content with the stored at least one captured image.

When the stored at least one captured image is displayed in response to a request received from the user, the control unit may control the display unit to jointly display the stored at least one captured image and the portion of the content corresponding to the stored at least one captured image.

The control unit may transmit the stored at least one captured image and the portion of the content to an external server, and receive, in response to the transmission, information relating to recommended contents from the external server.

The foregoing and/or other aspects may be achieved by providing a method for displaying an image which may be executed by a display apparatus, including: receiving a content; capturing at least one image of a user while displaying the content; and displaying a portion of the content with at least one image captured while displaying the portion of the content from among the captured at least one image of the user.

The method may further include: using the at least one captured image to generate emotional state information relating to the user; and determining the portion of the content.

The using the at least one captured image to generate emotional state information may include: extracting a face area from the at least one captured image; and analyzing a facial expression of the user based on the extracted face area.

The using the at least one captured image to generate emotional state information may include: extracting a body area from the at least one captured image; and analyzing a motion of the user based on the extracted body area.

The method may further include receiving voice data relating to the user, and the using the at least one captured image to generate emotional state information may include generating the emotional state information by analyzing the received voice data.

The method may further include determining whether the emotional state information corresponds to one of a plurality of set states.

The method may further include determining a highlighting interval relating to the content based on highlighting interval information received with the content, and displaying the highlighting interval relating to the content with the at least one captured image, captured while displaying the highlighting interval of the content.

The method may further include determining a highlighting interval relating to the content by analyzing the content, and displaying the highlighting interval relating to the content with the at least one captured image, captured while displaying the highlighting interval of the content.

The capturing at least one image of a user may be performed when the determined highlighting interval is displayed.

The displaying a portion of the content with the at least one captured image may be performed when a replay of the content ends.

When the content is displayed in response to a request received from the user, and when a determination is made that the portion of the content is being displayed, the method may further include jointly displaying the portion of the content with the at least one captured image.

When the at least one captured image is displayed in response to a request from the user, the method may further include jointly displaying the at least one captured image with the portion of the content corresponding to the at least one captured image.

The method may further include: transmitting the at least one captured image and the portion of the content to an external server; and receiving information relating to recommended contents from the external server.

BRIEF DESCRIPTION OF THE DRAWINGS

The above and/or other aspects will become apparent and more readily appreciated from the following description of the exemplary embodiments, taken in conjunction with the accompanying drawings, in which:

FIGS. 6A and 6B are fourth control flow charts which illustrate a set of operations performed by the display apparatus according to an exemplary embodiment.

DETAILED DESCRIPTION OF EXEMPLARY EMBODIMENTS

Figure 1:
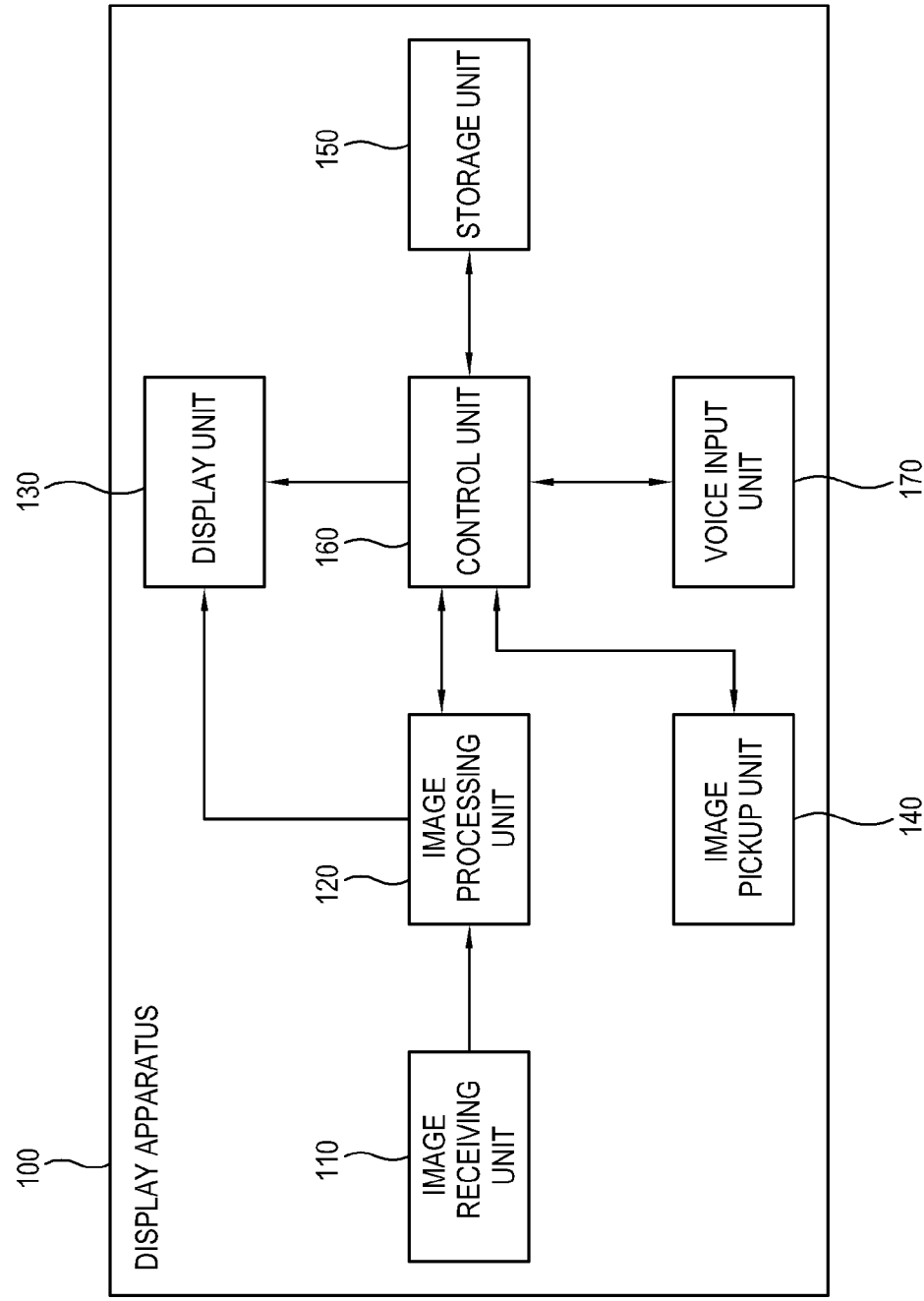
FIG. 1 is a control block diagram showing a display apparatus according to an exemplary embodiment.

Below, exemplary embodiments will be described in detail with reference to accompanying drawings so as to be easily realized by a person having ordinary skill in the art. The exemplary embodiments may be embodied in various forms without being limited to the exemplary embodiments set forth herein. Descriptions of well-known parts are omitted for clarity, and like reference numerals refer to like elements throughout. In the following embodiments, explanation of components having no direct relation to the spirit of the present inventive concept is omitted. However, it is appreciated that there is no intention to exclude such omitted components from a display system to which the spirit of the present inventive concept may be applied.

FIG. 1 is a control block diagram showing a display apparatus 100 according to an exemplary embodiment.

Referring to FIG. 1, the display apparatus 100 includes an image receiving unit 110, an image processing unit 120, a display unit 130, an image pickup unit 140, a storage unit 150 and a control unit 160. The display apparatus 100 may be implemented with, but is not limited to, a television (TV), a monitor or any other type of device which is configured to display an image. One or more of the image receiving unit 110, the image processing unit 120, and the control unit 160 may be implemented by a hardware component, such as, for example, an integrated circuit or a dedicated processor. Alternatively, one or more of the image receiving unit 110, the image processing unit 120, and the control unit 160 may be implemented as a software module, such as, for example, a non-transitory computer readable medium which stores a program which, when executed, performs a respective function.

The image receiving unit 110 receives an image signal from an external image source (not shown), and the image signal contains a content. Examples of the image source may include a computer which includes a central processing unit (CPU) and a graphic card which are usable to generate and provide an image signal in a local manner, a server which provides an image signal to a network, a broadcasting station transmitter which transmits a broadcasting signal using a radio wave or a cable, or any other type of device which is configured to provide image data.

The image processing unit 120 performs one or more of a series of image processing functions upon the image signal received from the image receiving unit 110 such that the contents contained in the image signal can be displayed on the display unit 130 which will be described later. The series of image processing functions performed by the image processing unit 120 may include, for example, decoding, deinterlacing, frame refresh rate conversion, scaling, noise reduction for image enhancement, detail enhancement, line scanning, and any other type of image processing function which may be used with respect to a variety of image formats.

The display unit 130 displays the content delivered from the image processing unit 120. The display unit 130 may include a display panel on which the contents are displayed, and a panel driver which processes the input image signal such that the contents can be displayed on the display panel, additional details of which are known in the art and therefore are not described herein.

The image pickup unit 140 obtains, or captures, an image of a user, and the image pickup unit 140 may capture while the content displays on the display unit 130. The image pickup unit 140 may be implemented with an optical system which includes, for example, lenses, a known camera or digital camcorder which includes a component for converting sensed incident light into an electrical signal for generating an image, or the like. In this exemplary embodiment, in addition to or as an alternative to the image pickup unit 140, the display apparatus 100 may receive an image signal from an external image pickup device connected to the display apparatus 100 via a cable or via a wireless communication connection.

The storage unit 150 stores the content and an image captured by the image pickup unit 140. The storage unit 150 may be implemented with a storage device which includes a non-volatile memory, such as, for example, a hard disk drive (HDD), within the display apparatus 100 or alternatively may be implemented with an external storage device, such as a USB storage device or the like. Of course, other content-related data and other data may be stored together with the contents of the image signal and the captured image. In particular, the image which is captured may be a moving picture captured by the image pickup unit 140 or a still image obtained by capturing a portion of the moving picture, and may be stored.

The control unit 160 controls the entire operation of the display apparatus 100 of the present exemplary embodiment. Although not shown, the control unit 160 may include, for example, control programs, a nonvolatile memory such as a read only memory (ROM), a flash memory or the like in which the control programs are stored, a volatile memory such as a random access memory (RAM) into which at least some of the stored control programs are loaded, a microprocessor such as a central processing unit (CPU), a micro control unit (MCU) or the like which executes the loaded control programs, or any other type of processor or controller, such as dedicated circuitry.

The control unit 160 controls to display a portion of the content with the image captured while displaying the portion of the content among the captured images of the user. In particular, some portion of the content and the image captured by the image pickup unit 140 while the user watches the portion of the content are jointly displayed on the display unit 130. Accordingly, because the user can view both of the contents and the captured user image, the user can perceive a change in his/her emotional state which may occur during the particular replay interval of the contents. In this case, the particular replay interval of the contents may be embodied in various ways.

The control unit 160 may use the image captured by the image pickup unit 140 to generate emotional state information relating to the user, and then determine the portion of the content. The "emotional state information" refers to information relating to an emotion of the user who is viewing the particular replay interval, such as, for example, a pleasant state, a depressed state or a fearful state. Analysis of the captured image for determining the emotional state of the user may be implemented with several exemplary embodiments which will be described later.

The control unit 160 may extract a face area from the captured image, and then generate the emotional state information by analyzing a facial expression of the user based on the extracted face area. In particular, color information included in each pixel of the image may be extracted, and a pixel area corresponding to a skin color may be extracted as the face area. The control unit 160 may analyze the facial expression by, for example, recognizing motion of eyes, nose, mouth, a wrinkle on a forehead, or recognizing any other relevant feature in the face area of the user, and then generate the emotional state information corresponding to the recognized facial expression of the user. An algorithm which is usable to extract the face area of the user and to analyze the facial expression of the user may be implemented in various known methodologies.

The control unit 160 may extract a body area from the captured image, and then generate the emotional state information by analyzing a motion of the user based on the extracted body area. For example, when a particular motion of the user, such as raising both arms, clapping hands, or the like is sensed, the control unit 160 may determine that the emotional state of the user is a pleasant state. An algorithm which is usable to extract the body area of the user and to analyze the motion of the user may be also implemented in various known methodologies.

The display apparatus 100 of the present invention may further include a voice input unit 170 which receives voice data relating to and/or generated by the user. The voice input unit 170 includes a known filtering means (not shown) for filtering the user voice data, which removes machine sound and other sound, and transmits data, including the user voice data, to the control unit 160. The control unit 160 may generate the emotional state information of the user by analyzing user voice data received from the voice input unit 170. For example, if the user voice data is determined to correspond to a laughing voice, the emotional state of the user may be determined as a pleasant state.

The control unit 160 may determine whether or not the emotional state information corresponds to one of the above set states. For example, if the user sets the emotional state as a pleasant state, the control unit 160 analyzes the emotional state of the user from the captured image. If the emotional state is determined as a pleasant state, a contents replay interval may be displayed with the captured image while displaying an instant at which the captured image was captured.

The control unit 160 may display a highlighting interval relating to the content with the captured image captured while displaying the highlighting interval relating to the content. In particular, the control unit 160 may determine the highlighting interval by using highlighting interval information received with the content. In addition, the control unit 160 may determine the highlighting interval by analyzing the image signal. For example, the highlighting interval may be determined by separating a voice signal contained in the image signal from a remainder of the image signal, analyzing an intensity of the separated voice signal, and extracting a pattern of variation of the intensity of the voice signal.

If and when it is determined that the highlighting interval is being replayed during a contents replay, the control unit 160 may control the image pickup unit 140 to capture an image of a user who is viewing the contents. In this case, the highlighting interval and a moving picture or still image of the user may be stored in the storage unit 150 in synchronization therebetween. Alternatively, when the contents are replayed, a viewing interval relating to a user image captured by the image pickup unit 140 may be separated from the highlighting interval and stored in the storage unit 150 in synchronization with the highlighting interval.

Displaying the portion of the content and the captured image captured while the portion of the content is displayed may be implemented in various exemplary embodiments.

When a replay of the content has ended, the control unit 160 may control the display unit to jointly display the portion of the content with the captured image. For example, if the user views an externally received broadcast program and an advertisement is provided after contents contained in the broadcast program are ended and before other contents start, the control unit 160 may display the stored portion of the contents and the captured image on the display unit 130, instead of displaying the advertisement. In this case, if the user image is a still image, it may be displayed, in the form of a slide, on the display unit 130.

When the content is displayed in response to a request received from the user, and when the portion of the content is replayed, the control unit 160 may jointly display the portion of the content and the captured image corresponding to the portion of the content on the display unit 130. In addition, when the captured image is displayed in response to a request from the user, the control unit 160 may jointly display the portion of the content corresponding to the user image displayed currently on the display unit 130.

The control unit 160 may transmit the portion of the content and the captured image to an external server. The display apparatus 100 may access the external server, for example, via the Internet, and the external server may then exchange data with a plurality of display apparatuses 100. Image data which is transmitted to the external server and synchronized by a home page or a social network service (SNS) may be shared by a plurality of users, and accordingly, one or more of the plurality of users may recommend contents. Accordingly, the control unit 160 may receive information relating to recommended contents from the external server.

Figure 2:
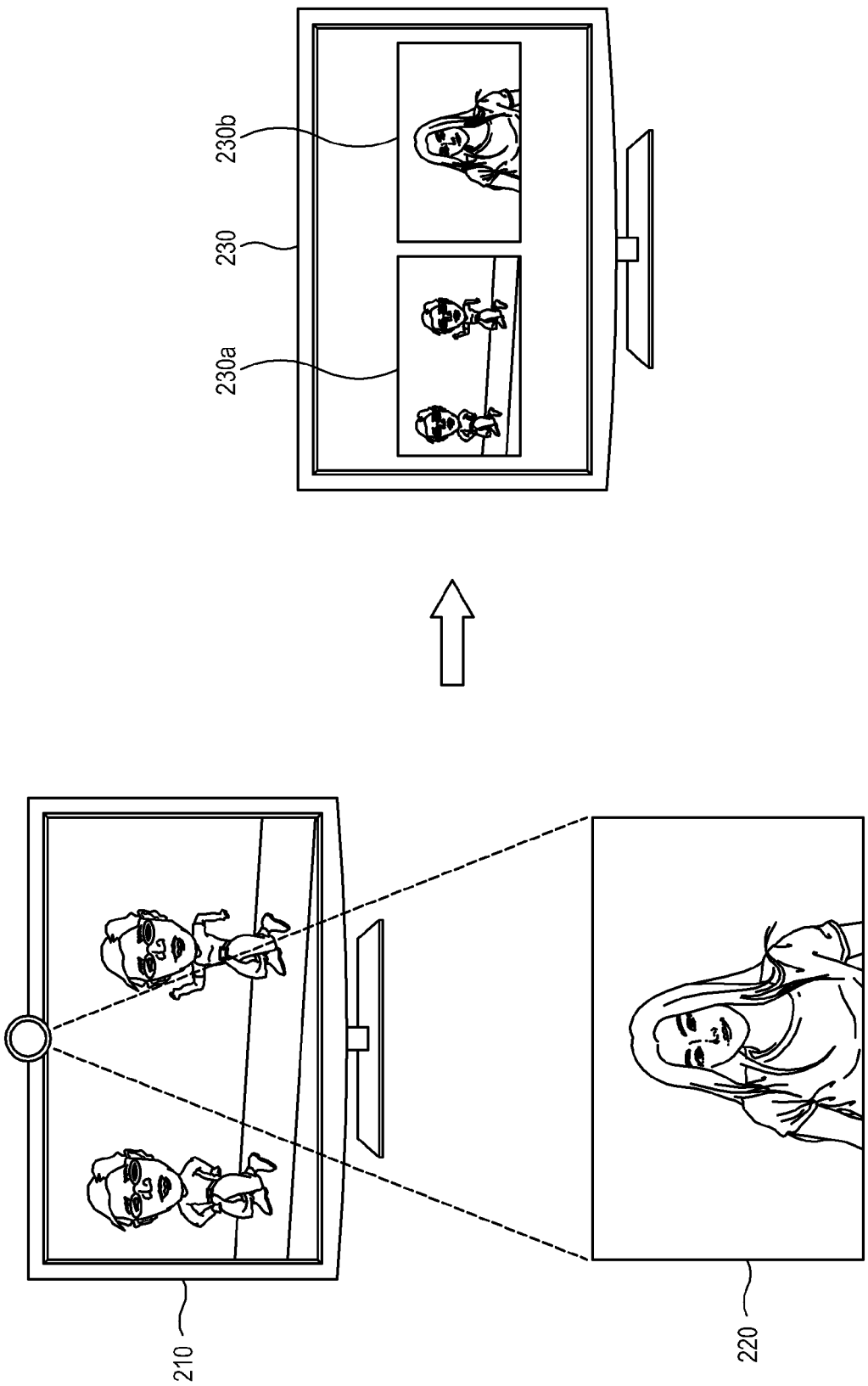
FIG. 2 is a view showing a screen of the display apparatus on which contents and a synchronized and stored image of a user are displayed, according to an exemplary embodiment.

FIG. 2 is a view showing a screen of the display apparatus 100 on which a portion of a content and a captured image is displayed, according to an exemplary embodiment.

As shown in FIG. 2, contents are displayed (210) on the display unit and the image pickup unit captures (220) an image of a user who is viewing the contents. Under control of the control unit, a portion of the content and a image captured while a portion of the content is displayed are stored in the storage unit in synchronization therebetween, and if an automatic replay mode is set or the synchronized and stored image is requested to be replayed according to an instruction received from the user, the portion of the content and the user image captured while displaying the portion of the content are displayed together on the display unit.

As shown in FIG. 2, a contents picture 230*a* and a user image 230*b* may be respectively displayed (230), for example, on the left side and right side of the display unit. Alternatively, they may be displayed in a vertical arrangement, in a main picture/picture in picture (PIP) arrangement or in other arrangements.

Figure 3:
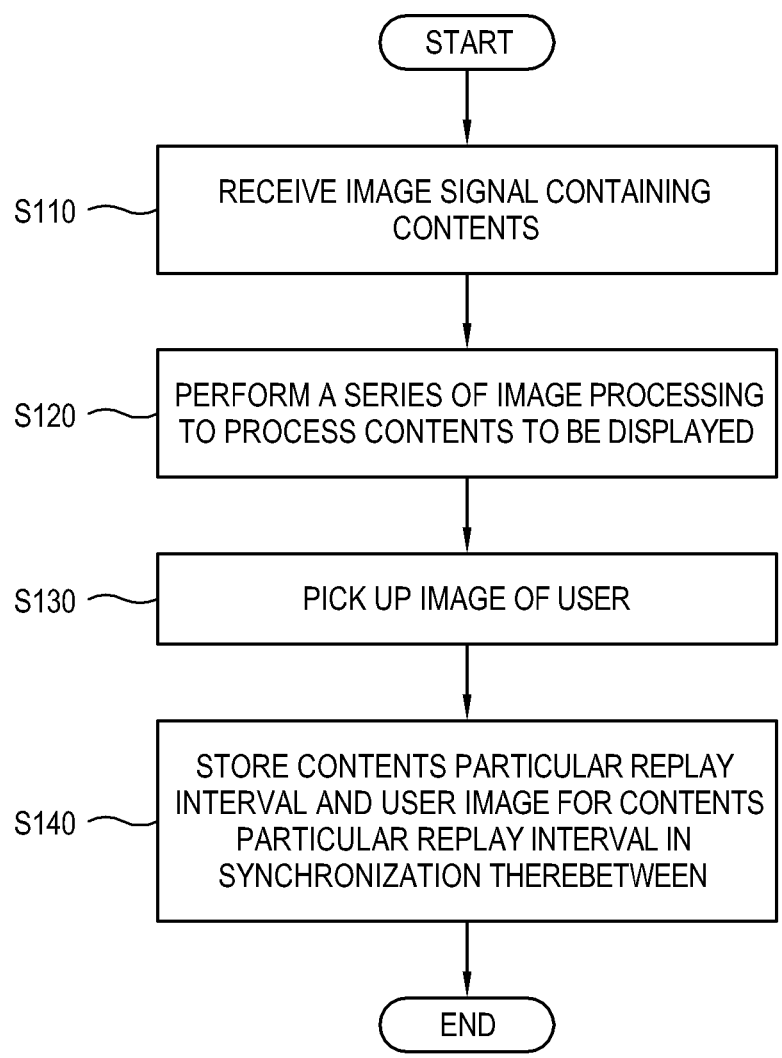
FIG. 3 is a first control flow chart which illustrates a set of operations performed by the display apparatus according to an exemplary embodiment.

FIG. 3 is a first control flow chart which illustrates a set of operations performed by the display apparatus 100 according to an exemplary embodiment.

The display apparatus of this exemplary embodiment receives an image signal containing contents (operation S110). The display apparatus receives an image signal from an external image source (not shown), and the possible types of image sources and the possible types of contents are not particularly limited. The display apparatus performs a series of image processing functions upon the received image signal to process the contents to be displayed (operation S120). The series of image processing functions may include, for example, decoding, deinterlacing, frame refresh rate conversion, scaling, noise reduction for image enhancement, detail enhancement, line scanning, and any other suitable image processing function which may be executed with respect to a variety of image formats.

The display apparatus displays the image processed content (operation S130), and picks up, obtains, or captures, an image of a user who is viewing the content (operation S140). The display apparatus of this exemplary embodiment may capture an image of a user who is viewing the contents by means of an internal image pickup unit, or may receive a captured and processed image signal from an external image pickup device connected to the display apparatus via a cable or via a wireless communication connection.

The display apparatus displays a portion of the content with the image captured while displaying the portion of the content from among the captured images of the user (operation S150). Further, the display apparatus stores the displayed portion of the content and the captured user image in synchronization therebetween. Because the user can view both of the contents and the user image stored in synchronization therebetween, the user may perceive a change in his/her emotional state while viewing the particular replay interval. In this case, the portion of the content may be embodied in various ways.

Figure 4:
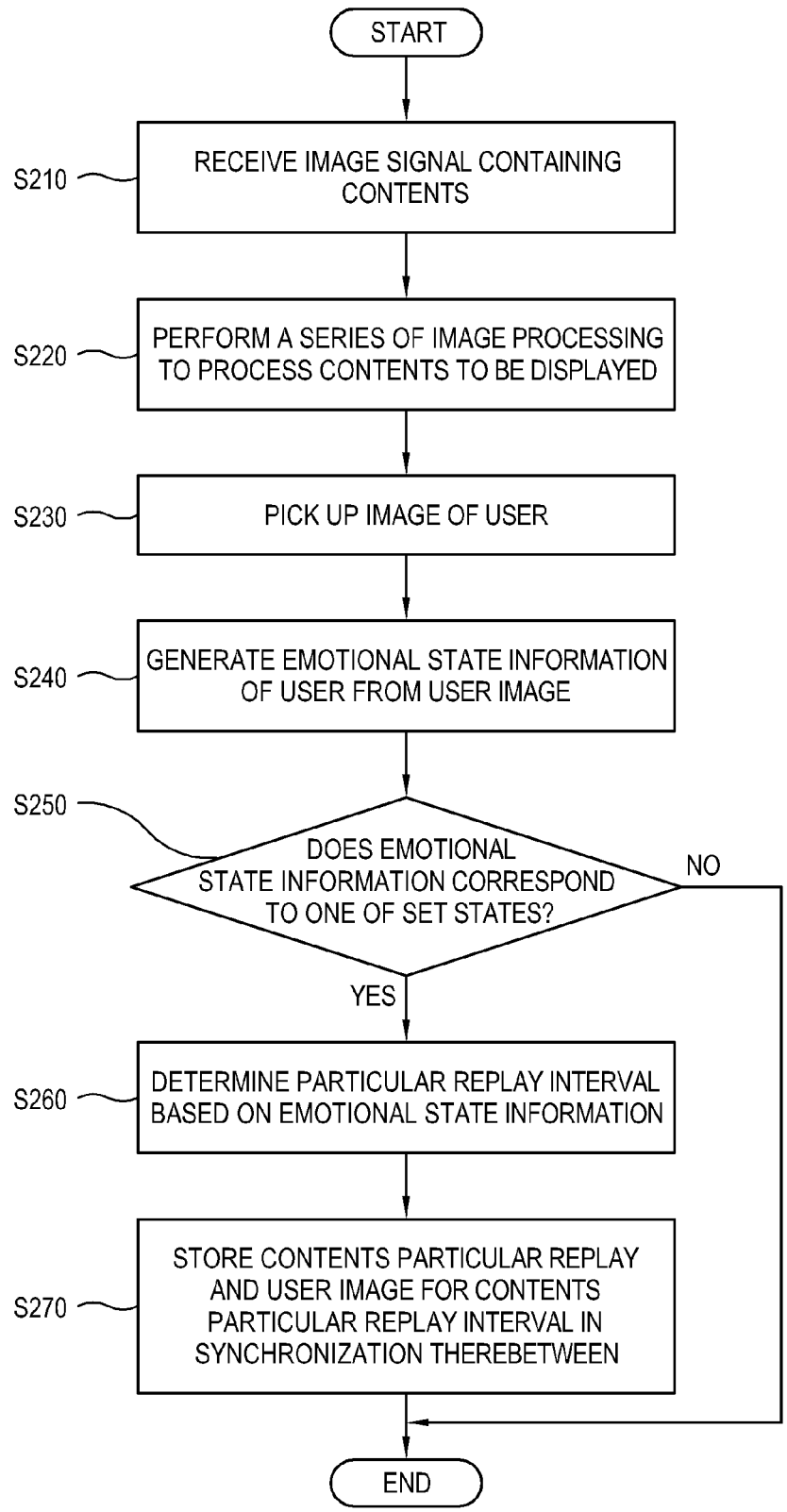
FIG. 4 is a second control flow chart which illustrates a set of operations performed by the display apparatus according to an exemplary embodiment.

FIG. 4 is a second control flow chart which illustrates a set of operations performed by of the display apparatus 100 according to an exemplary embodiment. An exemplary embodiment in which a particular replay interval is determined based on emotional state information of a user will be described with reference to FIG. 4.

The display apparatus of this exemplary embodiment receives an image signal containing contents (operation S210) and performs a series of image processing for functions upon the received image signal for processing the contents to be displayed (operation S220). The display apparatus displays the processed content and then picks up, obtains, or captures an image of a user who is viewing the content (operation S230).

The display apparatus uses the captured user image to generate emotional state information relating to the user who is viewing the content (operation S240). The emotional state information includes information relating to an emotion of the user who is viewing the portion of the content such as, for example, a pleasant state, a depressed state or a fearful state.

Analysis of the captured user image which is usable to determine the emotional state of the user may be implemented in various ways which will be described below.

For example, a face area may be extracted from the captured user image, and the emotional state information may be generated by analyzing a facial expression of the user from the extracted face area. In particular, color information included in each pixel of an image frame may be extracted, and a pixel area corresponding to a skin color may be extracted as the face area. The display apparatus may determine the facial expression by, for example, recognizing motion of eyes, nose, mouth, a wrinkle on a forehead, or recognizing any other relevant feature in the extracted face area, and the display apparatus may then generate the emotional state information corresponding to the recognized facial expression of the user. An algorithm which is usable to extract and analyze the face area of the user may be implemented in various known methodologies.

In addition, a body area may be extracted from the captured user image, and the emotional state information may be generated by analyzing a motion of the user from the extracted body area. For example, when a particular motion of the user, such as, for example, raising both arms, clapping hands, or the like is sensed, the display apparatus may determine that the emotional state of the user is a pleasant state. An algorithm which is usable to extract the body area of the user and analyze the motion of the user may be also implemented in various known methodologies.

In addition, the display apparatus may receive voice data relating to and/or generated by the user, and then generate the emotional state information by analyzing the received user voice data. For example, if the user voice data is determined to correspond to a laughing voice, the emotional state of the user may be determined as a pleasant state. An algorithm which is usable to determine the emotional state by analyzing the user voice data may be also implemented in various known methodologies.

The display apparatus may determine whether or not the emotional state information corresponds to one of the above set states (operation S250) and determine a portion of the content based on the generated emotional state information (operation S260). For example, if the user sets the emotional state as a pleasant state, and the display apparatus determines, based on an analysis of the user image, that the user emotional state is a pleasant state, a portion of the content at that instant may be displayed with the captured image.

The display apparatus displays a portion of the content with the image captured while displaying the portion of the content from among the captured images of the user (operation S270). Further, the display apparatus stores the displayed portion of the content and the captured user image in synchronization therebetween. Because the user can view both of the contents and the user image stored in synchronization therebetween, the user may perceive a change in his/her emotional state while viewing the portion of the content.

Figure 5:
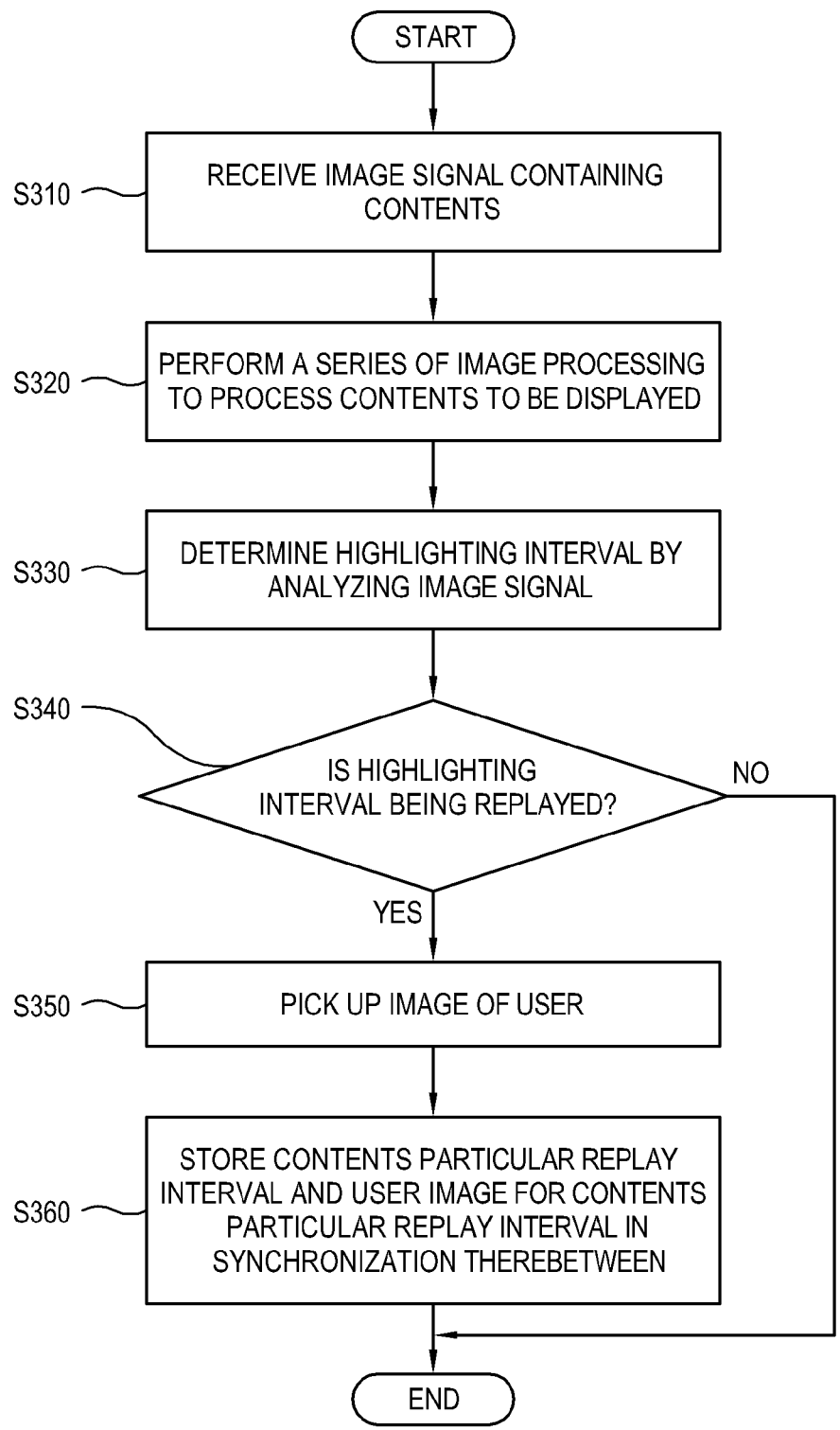
FIG. 5 is a third control flow chart which illustrates a set of operations performed by the display apparatus according to an exemplary embodiment.

FIG. 5 is a third control flow chart which illustrates a set of operations performed by the display apparatus 100 according to an exemplary embodiment. An exemplary embodiment in which a portion of a content is a highlighting interval will be described with reference to FIG. 5.

The display apparatus of this exemplary embodiment receives an image signal containing contents (operation S310) and performs a series of image processing functions upon the received image signal for processing the contents to be displayed (operation S320).

The display apparatus determines a highlighting interval relating to the contents contained in the image signal by analyzing the image signal (operation S330). For example, the highlighting interval may be determined by separating a voice signal contained in the image signal from a remainder of the image signal, analyzing an intensity of the separated voice signal, and extracting a pattern of variation of the intensity of the voice signal. In addition, the highlighting interval may be determined by using highlighting interval information contained in the image signal.

When the highlighting interval is replayed (operation S340), the display apparatus picks up, obtains, or captures an image of a user who is viewing the contents (S350). The display apparatus of this exemplary embodiment may pick up an image of a user who is viewing the contents, for example, by means of an internal image pickup unit, or may receive a captured and processed image signal from an external image pickup device connected to the display apparatus via a cable or via a wireless communication connection. The display apparatus displays the highlighting interval of the content with the image captured while displaying the highlighting interval (operation S360).

Figure 6A:
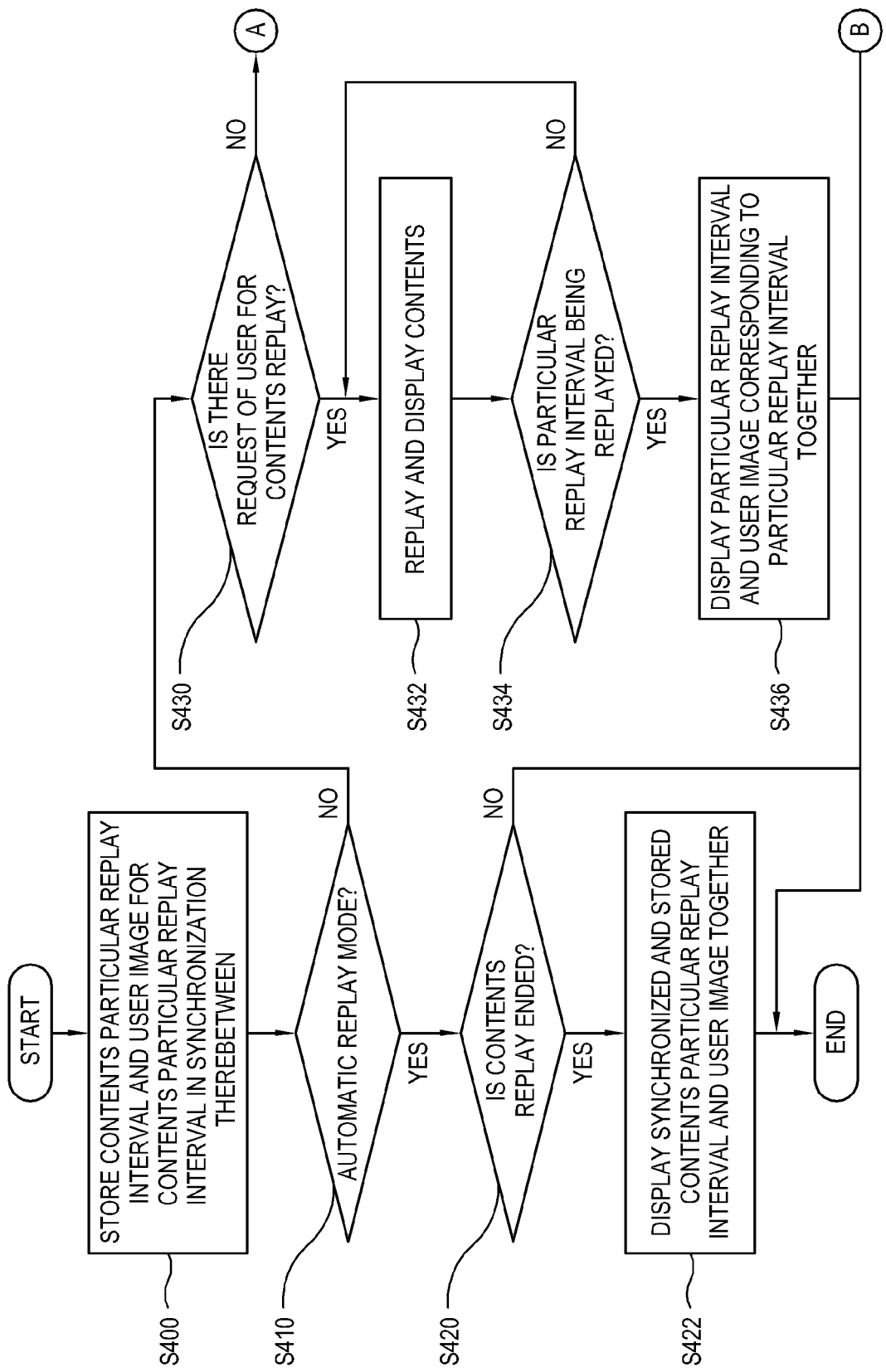

FIGS. 6A and 6B are fourth control flow charts which illustrate a set of operations performed by the display apparatus 100 according to an exemplary embodiment. An exemplary embodiment in which the portion of the content and a user image are displayed by using the display apparatus will be described with reference to FIGS. 6A and 6B.

The display apparatus displays a portion of a content and a user image while displaying the portion of the content (operation S400). Determining the portion of the content has been described above.

The display apparatus checks whether or not an automatic replay mode of the stored data is set by a user (operation S410). If the display apparatus determines that the automatic replay mode is set, when a contents replay is ended (operation S420), the portion of the content and the user image captured while displaying the portion of the content are jointly displayed (operation S422). For example, if the user views an externally received broadcast program and an advertisement is provided after contents contained in the broadcast program are ended and before other contents start, the synchronized and stored portion of the content and the corresponding user image may be displayed instead of displaying the advertisement. If the user image is a still image, the user image may be displayed, in the form of a slide, on the display apparatus.

If the display apparatus determines that the automatic replay mode is not set, the display apparatus checks whether or not a request has been received from the user for contents replay (operation S430). If the display apparatus determines that such a request for contents replay has been received, the contents are accordingly replayed and displayed (operation S432). If the display apparatus determines that the above-described portion of the content is replayed during the content replay (operation S434), the content and the user image corresponding to the portion of the content are displayed together (operation S436).

Next, the display apparatus checks whether a request has been received from the user for user image replay (operation S440). If the display apparatus determines that such a request for user image replay has been received, the user image is accordingly replayed and displayed (operation S442). If the display apparatus determines that an interval corresponding to the portion of the content is reached during the user image replay (operation S444), the user image and the portion of the content corresponding to the user image are displayed together (operation S446).

Although a few exemplary embodiments have been shown and described, it will be appreciated by those skilled in the art that changes may be made in these exemplary embodiments without departing from the principles and spirit of the present disclosure, the scope of which is defined in the appended claims and their equivalents. Therefore, it is to be understood that the disclosed embodiments are only examples without any limitation in all aspects.

What is claimed is:

1. A display apparatus comprising:
an image receiving unit which receives a content;
a display unit which displays the content;
a user information acquiring unit which acquires a user's information on a user watching the content;
a storage unit which stores the content; and
a control unit which controls the display unit to display a portion of the content with the user's information, acquired while displaying the portion of the content,
wherein the control unit uses the user's information to generate emotional state information relating to the user and determines the portion of the content based on the generated emotional state information, and
wherein the control unit determines a highlighting interval relating to the content based on highlighting interval information received with the content, and displays the highlighting interval relating to the content with the user's information, acquired while displaying the highlighting interval of the content.

2. The display apparatus according to claim 1, wherein the control unit extracts a face area from the user's information and generates the emotional state information by analyzing a facial expression of the user based on the extracted face area.

3. The display apparatus according to claim 1, wherein the control unit extracts a body area from the user's information and generates the emotional state information by analyzing a motion of the user based on the extracted body area.

4. The display apparatus according to claim 1, further comprising a voice input unit which receives voice data relating to the user,
wherein the control unit generates the emotional state information by analyzing the received voice data and determines the portion of the content.

5. The display apparatus according to claim 1, wherein the control unit determines whether the emotional state information corresponds to one of a plurality of set states.

6. The display apparatus according to claim 1, wherein the control unit determines the highlighting interval relating to the content by analyzing the content in conjunction with using the highlighting interval information, and displays the highlighting interval relating to the content with the user's information, acquired while displaying the highlighting interval of the content.

7. The display apparatus according to claim 1, wherein the control unit controls the user information acquiring unit to acquire the user's information when the determined highlighting interval is displayed.

8. The display apparatus according to claim 1, wherein, when a replay of the content ends, the control unit controls the display unit to display the portion of the content with the user's information.

9. The display apparatus according to claim 1, wherein, when the content is displayed in response to a request received from the user, and when the portion of the content is displayed, the control unit controls the display unit to display the portion of the content with the user's information.

10. The display apparatus according to claim 1, wherein, when the user's information is displayed in response to a request from the user, the control unit controls the display unit to jointly display the user's information and the portion of the content corresponding to the user's information.

11. The display apparatus according to claim 1, wherein the control unit transmits the user's information and the portion of the content to an external server and receives, in response to the transmission, information relating to recommended contents from the external server.

12. A method for displaying an image, comprising:
receiving a content;
acquiring a user's information on a user watching the content while displaying the content;
using the user's information to generate emotional state information relating to the user; and
displaying a portion of the content with the user's information acquired while displaying the portion of the content,
wherein the displaying comprises determining the portion of the content based on the generated emotional state information,
and the method further comprising:
determining a highlighting interval relating to the content based on highlighting interval information received with the content, and
displaying the highlighting interval relating to the content with the user's information, acquired while displaying the highlighting interval of the content.

13. The method according to claim 12, wherein the using the user's information to generate emotional state information comprises:
extracting a face area from the user's information; and
analyzing a facial expression of the user based on the extracted face area.

14. The method according to claim 12, wherein the using the user's information to generate emotional state information comprises:
extracting a body area from the user's information; and
analyzing a motion of the user based on the extracted body area.

15. The method according to claim 12, further comprising receiving voice data relating to the user,
wherein the using the user's information to generate emotional state information comprises generating the emotional state information by analyzing the received voice data.

16. The method according to claim 12, further comprising determining whether the emotional state information corresponds to one of a plurality of set states.

17. The method according to claim 12, further comprising determining the highlighting interval relating to the content by analyzing the content in conjunction with using the highlighting interval information, and
displaying the highlighting interval relating to the content with the user's information, acquired while displaying the highlighting interval of the content.

18. The method according to claim 12, wherein the acquiring the user's information is performed when the determined highlighting interval is displayed.

19. The method according to claim 12, wherein the displaying a portion of the content with the user's information is performed when a replay of the content ends.

20. The method according to claim 12, wherein when the content is displayed in response to a request from the user, and when a determination is made that the portion of the content is being displayed, jointly displaying the portion of the content with the user's information.

21. The method according to claim 12, wherein, when the at least one captured image is displayed in response to a request from the user, jointly displaying the user's information with the portion of the content corresponding to the user's information.

22. The method according to claim 12, further comprising:
transmitting the user's information and the portion of the content to an external server; and receiving information relating to recommended contents from the external server.

* * * * *